United States Patent
Ciesla et al.

(10) Patent No.: US 8,570,295 B2
(45) Date of Patent: *Oct. 29, 2013

(54) USER INTERFACE SYSTEM

(75) Inventors: Craig Michael Ciesla, Mountain View, CA (US); Micah B Yairi, Daly City, CA (US)

(73) Assignee: Tactus Technology, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/414,595

(22) Filed: Mar. 7, 2012

(65) Prior Publication Data

US 2012/0200529 A1    Aug. 9, 2012

Related U.S. Application Data

(63) Continuation-in-part of application No. 11/969,848, filed on Jan. 4, 2008, and a continuation of application No. 12/319,334, filed on Jan. 5, 2009, now Pat. No. 8,154,527.

(51) Int. Cl.
  *G06F 3/041*  (2006.01)
  *G09G 5/00*   (2006.01)

(52) U.S. Cl.
  USPC ............................... 345/173; 345/156

(58) Field of Classification Search
  USPC .......... 345/156–184, 104; 178/18.01–20.04
  See application file for complete search history.

(56) References Cited

U.S. PATENT DOCUMENTS

| | | | |
|---|---|---|---|
| 3,034,628 A | 5/1962 | Wadey | |
| 3,659,354 A | 5/1972 | Sutherland | |
| 3,759,108 A | 9/1973 | Borom et al. | |
| 3,780,236 A | 12/1973 | Gross | |

(Continued)

FOREIGN PATENT DOCUMENTS

| WO | 2008037275 A | 4/2008 |
|---|---|---|
| WO | 2009088985 A | 7/2009 |

(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

(Continued)

*Primary Examiner* — Alexander Eisen
*Assistant Examiner* — Patrick F Marinelli
(74) *Attorney, Agent, or Firm* — Jeffrey Schox; Peter Miller

(57) ABSTRACT

The user interface system of the preferred embodiment includes: a layer defining a surface, a substrate supporting the layer and at least partially defining a cavity, a displacement device coupled to the cavity and adapted to expand the cavity thereby deforming a particular region of the surface, a touch sensor coupled to the substrate and adapted to sense a user touch proximate the particular region of the surface, and a display coupled to the substrate and adapted to output images to the user. The user interface system of the preferred embodiments has been specifically designed to be incorporated into an electronic device, such as the display of a mobile phone, but may be incorporated in any suitable device that interfaces with a user in both a visual and tactile manner.

21 Claims, 17 Drawing Sheets

(56) References Cited

U.S. PATENT DOCUMENTS

| | | | |
|---|---|---|---|
| 3,818,487 A | 6/1974 | Brody et al. | |
| 4,109,118 A | 8/1978 | Kley | |
| 4,209,819 A | 6/1980 | Seignemartin | |
| 4,290,343 A | 9/1981 | Gram | |
| 4,307,268 A | 12/1981 | Harper | |
| 4,467,321 A | 8/1984 | Volnak | |
| 4,477,700 A | 10/1984 | Balash et al. | |
| 4,517,421 A | 5/1985 | Margolin | |
| 4,543,000 A | 9/1985 | Hasenbalg | |
| 4,700,025 A | 10/1987 | Hatayama et al. | |
| 4,920,343 A | 4/1990 | Schwartz | |
| 5,194,852 A | 3/1993 | More et al. | |
| 5,195,659 A | 3/1993 | Eiskant | |
| 5,212,473 A | 5/1993 | Louis | |
| 5,222,895 A | 6/1993 | Fricke | |
| 5,286,199 A | 2/1994 | Kipke | |
| 5,369,228 A | 11/1994 | Faust | |
| 5,412,189 A | 5/1995 | Cragun | |
| 5,459,461 A | 10/1995 | Crowley et al. | |
| 5,488,204 A | 1/1996 | Mead et al. | |
| 5,496,174 A * | 3/1996 | Garner | 434/114 |
| 5,666,112 A | 9/1997 | Crowley et al. | |
| 5,717,423 A | 2/1998 | Parker | |
| 5,729,222 A | 3/1998 | Iggulden et al. | |
| 5,742,241 A | 4/1998 | Crowley et al. | |
| 5,754,023 A | 5/1998 | Roston et al. | |
| 5,766,013 A | 6/1998 | Vuyk | |
| 5,767,839 A | 6/1998 | Rosenberg | |
| 5,835,080 A | 11/1998 | Beeteson et al. | |
| 5,880,411 A | 3/1999 | Gillespie et al. | |
| 5,889,236 A | 3/1999 | Gillespie et al. | |
| 5,917,906 A | 6/1999 | Thornton | |
| 5,943,043 A | 8/1999 | Furuhata et al. | |
| 5,977,867 A | 11/1999 | Blouin | |
| 5,982,304 A | 11/1999 | Selker et al. | |
| 6,067,116 A | 5/2000 | Yamano et al. | |
| 6,154,198 A | 11/2000 | Rosenberg | |
| 6,154,201 A | 11/2000 | Levin et al. | |
| 6,160,540 A | 12/2000 | Fishkin et al. | |
| 6,169,540 B1 | 1/2001 | Rosenberg et al. | |
| 6,188,391 B1 | 2/2001 | Seely et al. | |
| 6,218,966 B1 | 4/2001 | Goodwin et al. | |
| 6,243,074 B1 | 6/2001 | Fishkin et al. | |
| 6,243,078 B1 | 6/2001 | Rosenberg | |
| 6,268,857 B1 | 7/2001 | Fishkin et al. | |
| 6,271,828 B1 | 8/2001 | Rosenberg et al. | |
| 6,300,937 B1 | 10/2001 | Rosenberg | |
| 6,310,614 B1 | 10/2001 | Maeda et al. | |
| 6,323,846 B1 | 11/2001 | Westerman et al. | |
| 6,337,678 B1 | 1/2002 | Fish | |
| 6,354,839 B1 * | 3/2002 | Schmidt et al. | 434/113 |
| 6,356,259 B1 | 3/2002 | Maeda et al. | |
| 6,366,272 B1 | 4/2002 | Rosenberg et al. | |
| 6,369,803 B2 | 4/2002 | Brisebois et al. | |
| 6,384,743 B1 | 5/2002 | Vanderheiden | |
| 6,414,671 B1 | 7/2002 | Gillespie et al. | |
| 6,429,846 B2 | 8/2002 | Rosenberg et al. | |
| 6,437,771 B1 | 8/2002 | Rosenberg et al. | |
| 6,462,294 B2 | 10/2002 | Davidson et al. | |
| 6,469,692 B2 | 10/2002 | Rosenberg | |
| 6,486,872 B2 | 11/2002 | Rosenberg et al. | |
| 6,498,353 B2 | 12/2002 | Nagle et al. | |
| 6,501,462 B1 | 12/2002 | Garner | |
| 6,509,892 B1 | 1/2003 | Kamper et al. | |
| 6,573,844 B1 | 6/2003 | Venolia et al. | |
| 6,636,202 B2 | 10/2003 | Ishmael, Jr. et al. | |
| 6,639,581 B1 | 10/2003 | Moore et al. | |
| 6,655,788 B1 | 12/2003 | Freeman | |
| 6,657,614 B1 | 12/2003 | Ito et al. | |
| 6,667,738 B2 | 12/2003 | Murphy | |
| 6,681,031 B2 | 1/2004 | Cohen et al. | |
| 6,686,911 B1 | 2/2004 | Levin et al. | |
| 6,697,086 B2 | 2/2004 | Rosenberg et al. | |
| 6,700,556 B2 | 3/2004 | Richley et al. | |
| 6,703,924 B2 | 3/2004 | Tecu et al. | |
| 6,743,021 B2 | 6/2004 | Prince et al. | |
| 6,788,295 B1 | 9/2004 | Inkster | |
| 6,819,316 B2 | 11/2004 | Schulz et al. | |
| 6,850,222 B1 | 2/2005 | Rosenberg | |
| 6,861,961 B2 | 3/2005 | Sandbach et al. | |
| 6,877,986 B2 | 4/2005 | Fournier et al. | |
| 6,881,063 B2 | 4/2005 | Yang | |
| 6,930,234 B2 | 8/2005 | Davis | |
| 6,937,225 B1 | 8/2005 | Kehlstadt et al. | |
| 6,975,305 B2 | 12/2005 | Yamashita | |
| 6,979,164 B2 | 12/2005 | Kramer | |
| 6,982,696 B1 | 1/2006 | Shahoian | |
| 6,995,745 B2 | 2/2006 | Boon et al. | |
| 7,027,032 B2 | 4/2006 | Rosenberg et al. | |
| 7,056,051 B2 * | 6/2006 | Fiffie | 401/195 |
| 7,061,467 B2 | 6/2006 | Rosenberg | |
| 7,064,655 B2 | 6/2006 | Murray et al. | |
| 7,081,888 B2 | 7/2006 | Cok et al. | |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,109,967 B2 | 9/2006 | Hioki et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,129,854 B2 | 10/2006 | Arneson et al. | |
| 7,131,073 B2 | 10/2006 | Rosenberg et al. | |
| 7,136,045 B2 | 11/2006 | Rosenberg et al. | |
| 7,138,977 B2 | 11/2006 | Kinerk et al. | |
| 7,138,985 B2 | 11/2006 | Nakajima | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,151,528 B2 | 12/2006 | Taylor et al. | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,276 B2 | 1/2007 | Face | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |
| 7,191,191 B2 | 3/2007 | Peurach et al. | |
| 7,193,607 B2 | 3/2007 | Moore et al. | |
| 7,195,170 B2 | 3/2007 | Matsumoto et al. | |
| 7,196,688 B2 | 3/2007 | Schena | |
| 7,198,137 B2 | 4/2007 | Olien | |
| 7,199,790 B2 | 4/2007 | Rosenberg et al. | |
| 7,202,851 B2 | 4/2007 | Cunningham et al. | |
| 7,205,981 B2 | 4/2007 | Cunningham | |
| 7,208,671 B2 | 4/2007 | Chu | |
| 7,209,028 B2 | 4/2007 | Boronkay et al. | |
| 7,209,117 B2 | 4/2007 | Rosenberg et al. | |
| 7,209,118 B2 | 4/2007 | Shahoian et al. | |
| 7,210,160 B2 | 4/2007 | Anderson, Jr. et al. | |
| 7,215,326 B2 | 5/2007 | Rosenberg | |
| 7,216,671 B2 | 5/2007 | Unger et al. | |
| 7,218,310 B2 | 5/2007 | Tierling et al. | |
| 7,218,313 B2 | 5/2007 | Marcus et al. | |
| 7,233,313 B2 | 6/2007 | Levin et al. | |
| 7,233,315 B2 | 6/2007 | Gregorio et al. | |
| 7,233,476 B2 | 6/2007 | Goldenberg et al. | |
| 7,236,157 B2 | 6/2007 | Schena et al. | |
| 7,245,202 B2 | 7/2007 | Levin | |
| 7,245,292 B1 | 7/2007 | Custy | |
| 7,249,951 B2 | 7/2007 | Bevirt et al. | |
| 7,250,128 B2 | 7/2007 | Unger et al. | |
| 7,253,803 B2 | 8/2007 | Schena et al. | |
| 7,253,807 B2 | 8/2007 | Nakajima | |
| 7,265,750 B2 | 9/2007 | Rosenberg | |
| 7,280,095 B2 | 10/2007 | Grant | |
| 7,283,120 B2 | 10/2007 | Grant | |
| 7,283,123 B2 | 10/2007 | Braun et al. | |
| 7,289,106 B2 | 10/2007 | Bailey et al. | |

(56) References Cited

U.S. PATENT DOCUMENTS

| | | |
|---|---|---|
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 * | 4/2012 | Ciesla et al. ........... 345/173 |
| 8,159,461 B2 | 4/2012 | Martin et al. |
| 8,162,009 B2 | 4/2012 | Chaffee |
| 8,164,573 B2 | 4/2012 | Dacosta et al. |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 2001/0008396 A1 | 7/2001 | Komata |
| 2001/0043189 A1 | 11/2001 | Brisebois et al. |
| 2002/0106614 A1 | 8/2002 | Prince et al. |
| 2002/0110237 A1 | 8/2002 | Krishnan |
| 2003/0087698 A1 | 5/2003 | Nishiumi et al. |
| 2003/0179190 A1 | 9/2003 | Franzen |
| 2003/0206153 A1 | 11/2003 | Murphy |
| 2004/0056876 A1 | 3/2004 | Nakajima |
| 2004/0056877 A1 | 3/2004 | Nakajima |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |

(56) References Cited

U.S. PATENT DOCUMENTS

| | | |
|---|---|---|
| 2005/0057528 A1 | 3/2005 | Kleen |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0231489 A1 | 10/2005 | Ladouceur et al. |
| 2005/0253816 A1 | 11/2005 | Himberg et al. |
| 2005/0285846 A1 | 12/2005 | Funaki |
| 2006/0026521 A1 | 2/2006 | Hotelling et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0197753 A1 | 9/2006 | Hotelling |
| 2006/0214923 A1 | 9/2006 | Chiu et al. |
| 2006/0238495 A1* | 10/2006 | Davis ................... 345/156 |
| 2006/0238510 A1* | 10/2006 | Panotopoulos et al. ....... 345/168 |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0033617 A1 | 2/2009 | Lindberg et al. |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128503 A1 | 5/2009 | Grant et al. |
| 2009/0135145 A1 | 5/2009 | Chen et al. |
| 2009/0140989 A1 | 6/2009 | Ahlgren |
| 2009/0160813 A1* | 6/2009 | Takashima et al. ........... 345/173 |
| 2009/0167508 A1 | 7/2009 | Fadell et al. |
| 2009/0167509 A1 | 7/2009 | Fadell et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0243998 A1 | 10/2009 | Wang |
| 2009/0250267 A1 | 10/2009 | Heubel et al. |
| 2009/0303022 A1 | 12/2009 | Griffin et al. |
| 2010/0043189 A1 | 2/2010 | Fukano |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0177050 A1 | 7/2010 | Heubel et al. |
| 2010/0182245 A1 | 7/2010 | Edwards et al. |
| 2010/0295820 A1 | 11/2010 | Kikin-Gil |
| 2010/0321335 A1 | 12/2010 | Lim et al. |
| 2011/0001613 A1 | 1/2011 | Ciesla et al. |
| 2011/0012851 A1 | 1/2011 | Ciesla et al. |
| 2011/0029862 A1 | 2/2011 | Scott et al. |
| 2011/0148793 A1 | 6/2011 | Ciesla et al. |
| 2011/0148807 A1 | 6/2011 | Fryer |
| 2011/0157080 A1 | 6/2011 | Ciesla et al. |
| 2011/0175838 A1 | 7/2011 | Higa |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0098789 A1 | 4/2012 | Ciesla et al. |
| 2012/0105333 A1 | 5/2012 | Maschmeyer et al. |
| 2012/0193211 A1 | 8/2012 | Ciesla et al. |
| 2012/0200528 A1* | 8/2012 | Ciesla et al. .................. 345/174 |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |

FOREIGN PATENT DOCUMENTS

| | | |
|---|---|---|
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

Jeong et al., "Tunable Microdoublet Lens Array," Optical Society of America, Optics Express; vol. 12, No. 11. May 31, 2004, 7 Pages.

* cited by examiner

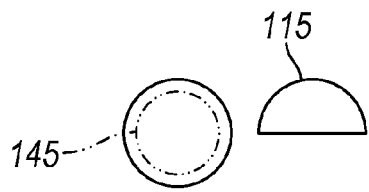
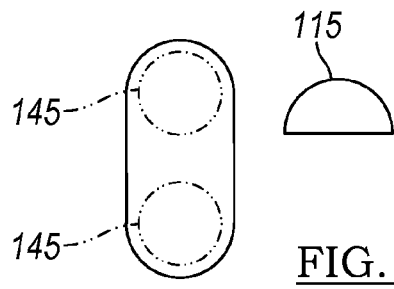
FIG. 11  FIG. 12
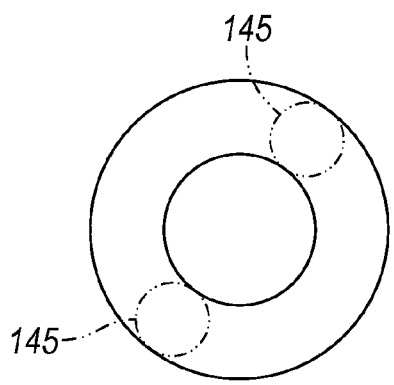
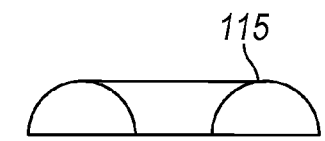
FIG. 13
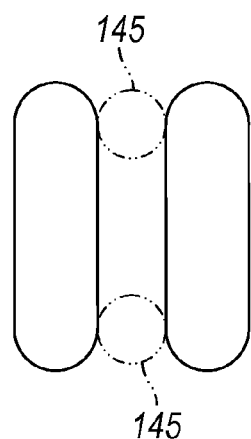
FIG. 14
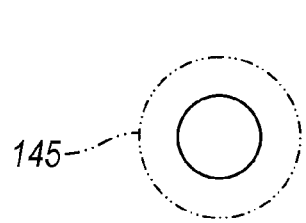
FIG. 15

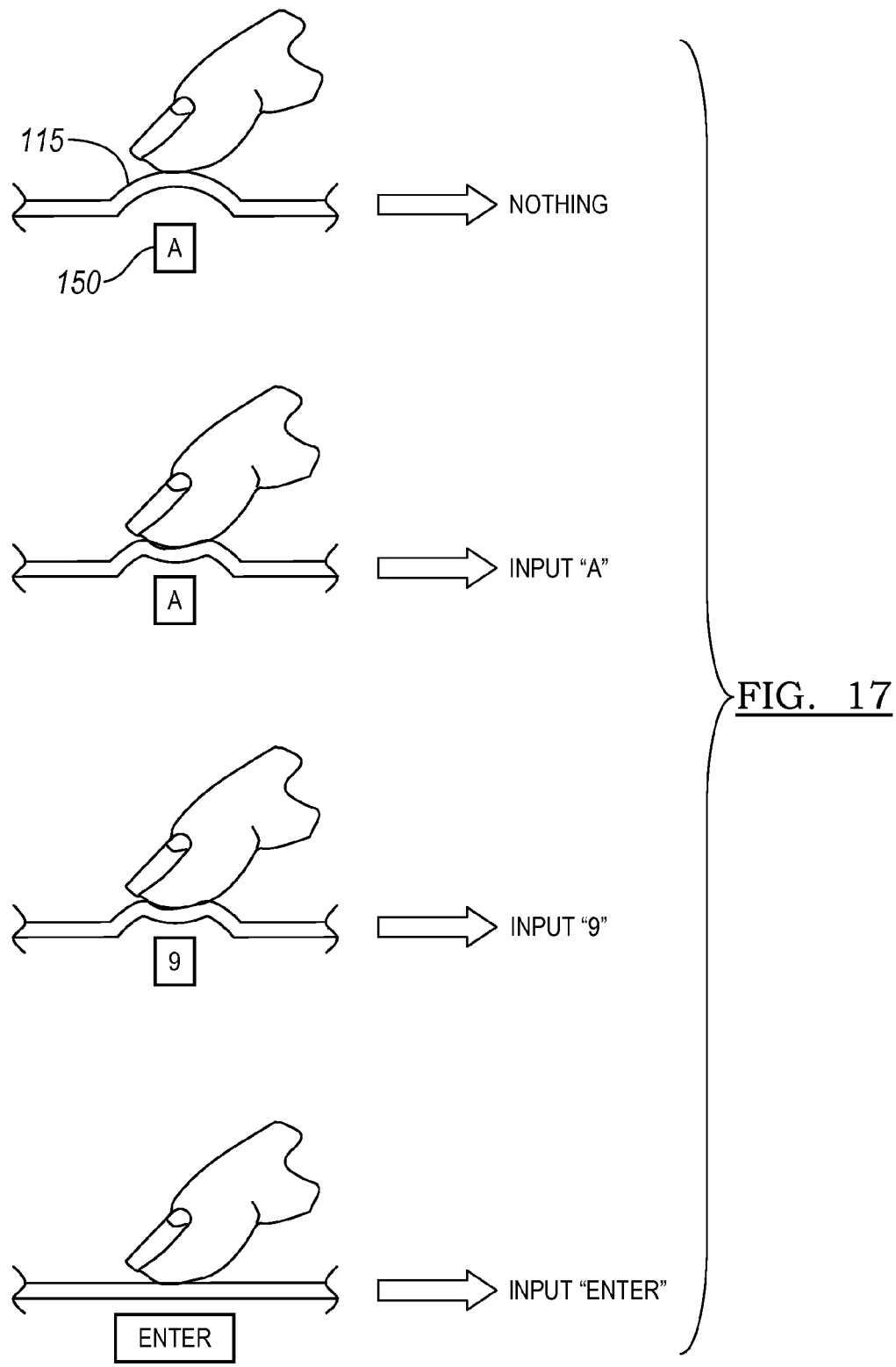

USER INTERFACE SYSTEM

CROSS-REFERENCE TO RELATED APPLICATIONS

This application is a continuation of prior U.S. application Ser. No. 12/319,334, filed on 5 Jan. 2009 and entitled "User Interface System," and which is incorporated in its entirety by this reference.

This application is a continuation-in-part of prior U.S. application Ser. No. 11/969,848, filed on 4 Jan. 2008 and entitled "System and Method for Raised Touch Screens," and which is incorporated in its entirety by this reference.

TECHNICAL FIELD

This invention relates generally to touch sensitive displays. More particularly, this invention relates to systems and methods for selectively raising portions of touch sensitive displays.

BACKGROUND

Touch sensitive displays, e.g., touch screens, are very useful in applications where a user can input commands and data directly on a display. Common applications for touch screens include consumer products such as cellular telephones and user interfaces for industrial process control. Depending on their specific applications, these touch sensitive displays are commonly used in devices ranging from small handheld PDAs, to medium sized tablet computers, to large pieces of industrial equipment.

It is often convenient to be able to input and output data to and from the user on the same display. Unlike a dedicated input device such as a keypad with discrete well-defined keys, most touch sensitive displays are generally flat. As a result, touch sensitive screens do not provide any tactile guidance for one or more control "buttons". Instead, touch sensitive displays rely on visual guidance for user input.

Hence a serious drawback of touch sensitive displays is its inherent difficulty to input data accurately because adjacent buttons are not distinguishable by feel. Wrongly entered key strokes are common and the user is forced to keep his or her eyes on the display. The importance of tactile guidance is readily apparent in the competition between the Apple iPhone and the BlackBerry 8800. With a limited size, the mobile phones prior to this invention could include either a large screen or tactile buttons. With this invention, mobile phones and other suitable electronic devices can include both.

BRIEF DESCRIPTION OF THE FIGURES

FIGS. 11, 12, 13, 14, and 15 are top and side views of a button deformation, a slider deformation, a slider ring deformation, a guide deformation, and a pointing stick deformation, respectively.

FIG. 17 is a schematic of the different input graphics, different cavity settings, and different user touches of the preferred embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
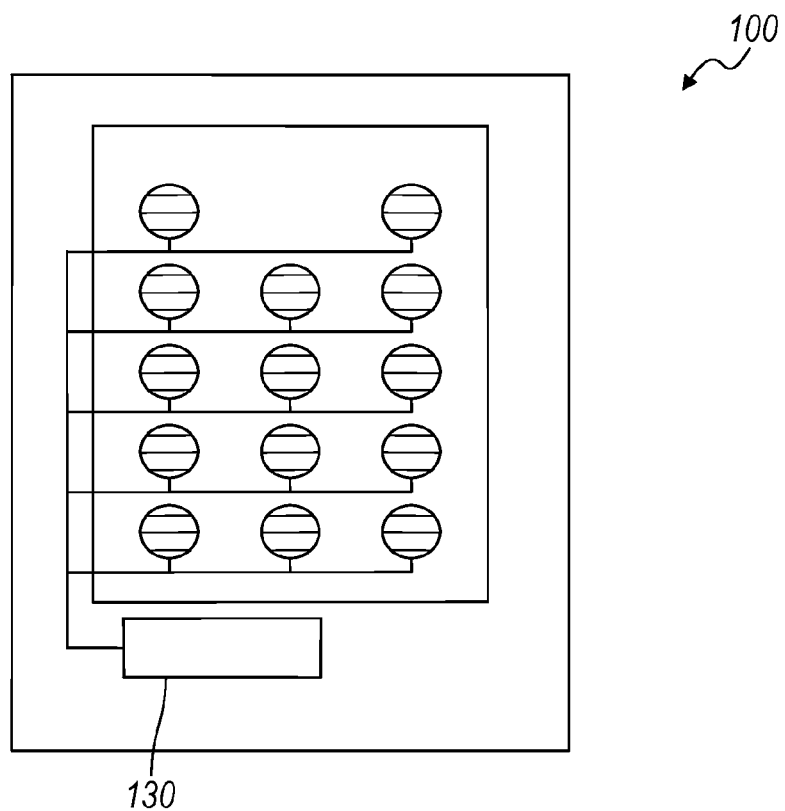
FIG. 1 is a top view of the user interface system of a preferred embodiment.
Figure 2:
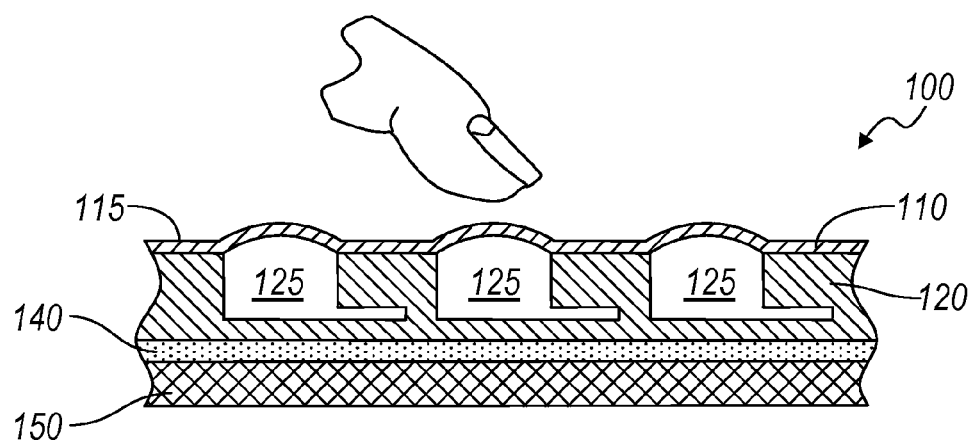
FIG. 2 is a cross-sectional view illustrating the operation of a button array in accordance to the preferred embodiments.

As shown in FIGS. 1 and 2, the user interface system 100 of the preferred embodiment includes: a layer 110 defining a surface 115, a substrate 120 supporting the layer no and at least partially defining a cavity 125, a displacement device 130 coupled to the cavity 125 and adapted to expand the cavity 125 thereby deforming a particular region of the surface 115, a touch sensor 140 coupled to the substrate 120 and adapted to sense a user touch proximate the particular region of the surface 115, and a display 150 coupled to the substrate 120 and adapted to output images to the user.

The user interface system 100 of the preferred embodiments has been specifically designed to be incorporated into an electronic device, such as the display of an automotive console, a desktop computer, a laptop computer, a tablet computer, a television, a radio, a desk phone, a mobile phone, a PDA, a personal navigation device, a personal media player, a camera, or a watch. The user interface system may, however, be incorporated in any suitable device that interfaces with a user in both a visual and tactile manner.

1. The Layer and Substrate

As shown in FIG. 2, the layer 110 of the preferred embodiment functions to provide the surface 115 that interfaces with a user in a tactile manner. The surface 115 is preferably continuous, such that when swiping a finger across the surface 115 a user would not feel any interruptions or seams. The surface 115 is also preferably planar. The surface 115 is preferably arranged in a flat plane, but may alternatively be arranged in a curved plane. The layer 110 also functions to deform upon an expansion of the cavity 125, and to preferably "relaxes" or "un-deforms" back to a normal planar state upon retraction of the cavity 125. The layer no is preferably elastic. In one version, the layer 110 is relatively more elastic in specific areas and relatively less elastic in other areas and is deformed in the relatively more elastic areas. In another version, the layer 110 is generally uniformly elastic. In yet another version, the layer 110 includes or is made of a smart material, such as Nickel Titanium (commonly referred to as "Nitinol"), that has a selective and/or variable elasticity. The layer 110 is preferably optically transparent, but may alternatively be translucent or opaque. In addition to the transparency, the layer 110 preferably has the following properties: a high transmission, a low haze, a wide viewing angle, a minimal amount of back reflectance upon the display 150 (if the display 150 is coupled with the user interface), scratch resistant, chemical resistant, stain resistant, and relatively smooth (not tacky) to the touch. The layer 110 is preferably made from a suitable elastic material, including polymers and silicon-based elastomers such as poly-dimethylsiloxane (PDMS) or RTV Silicon (e.g., RTV Silicon 615). The layer 110 may, however, be made of any suitable material that provides the surface 115 and that deforms. In one version, the layer 110 is a single homogeneous layer less than 1 mm thick (preferably 50 to 200 microns). In another version, the layer 110 may be constructed using multiple layers or coatings from the same material or from different suitable materials.

Figure 3A:
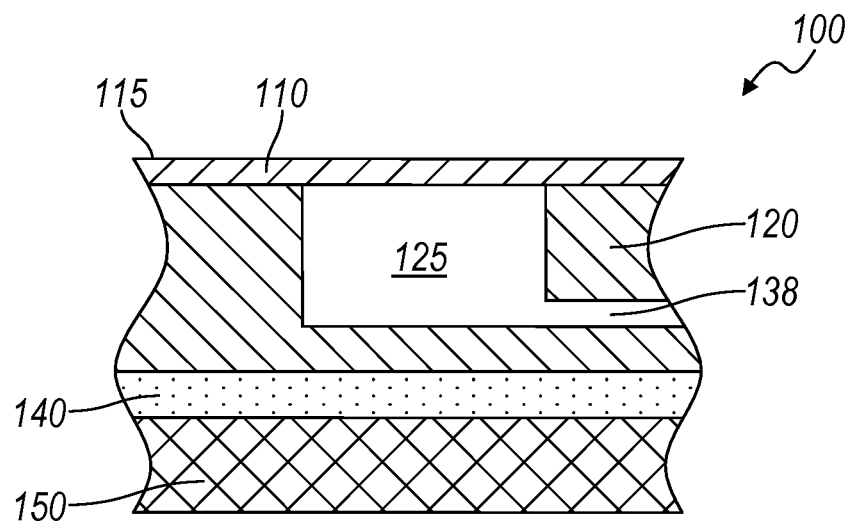
FIGS. 3a and 3b are cross-sectional views of the layer, the substrate, the cavity, the touch sensor, and the display of the preferred embodiments, with the cavity in a retracted volume setting and an expanded volume setting, respectively.
Figure 3B:
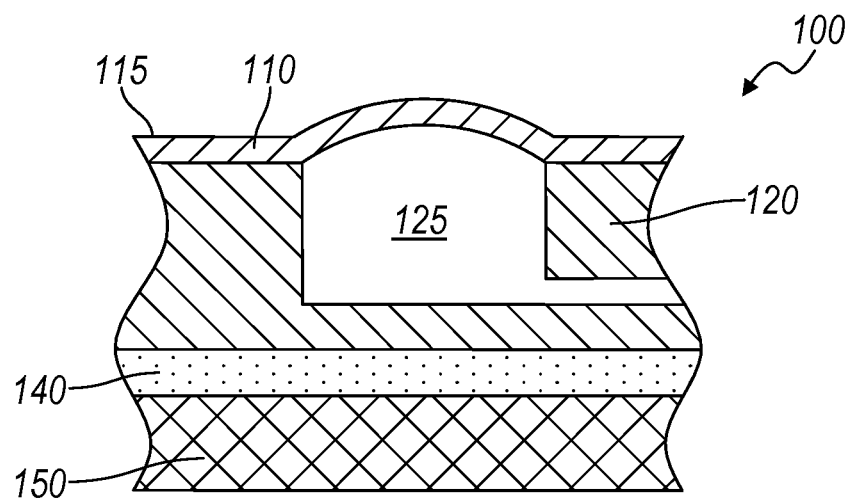
Figure 4A:
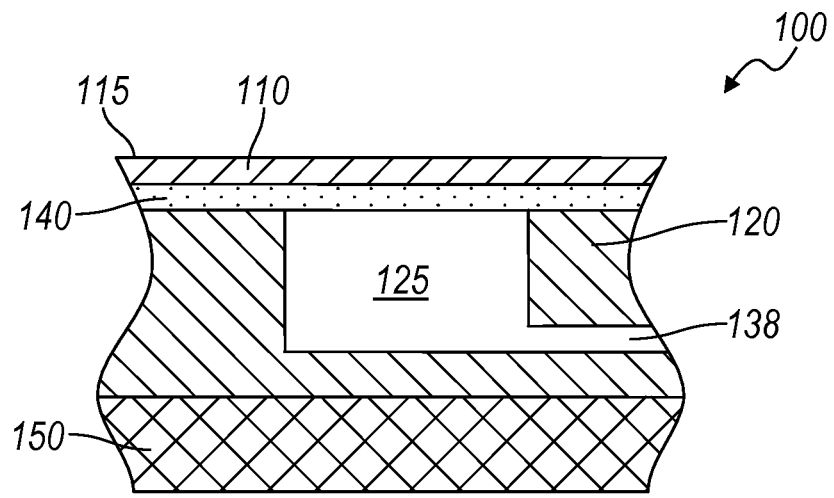
FIGS. 4a and 4b are cross-sectional views of the touch sensor located above the substrate, with the cavity in a retracted volume setting and an expanded volume setting, respectively.
Figure 4B:
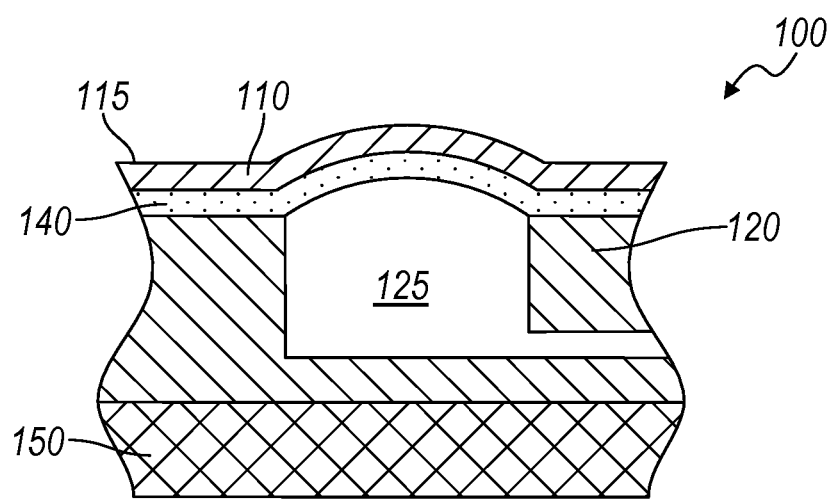
Figure 5A:
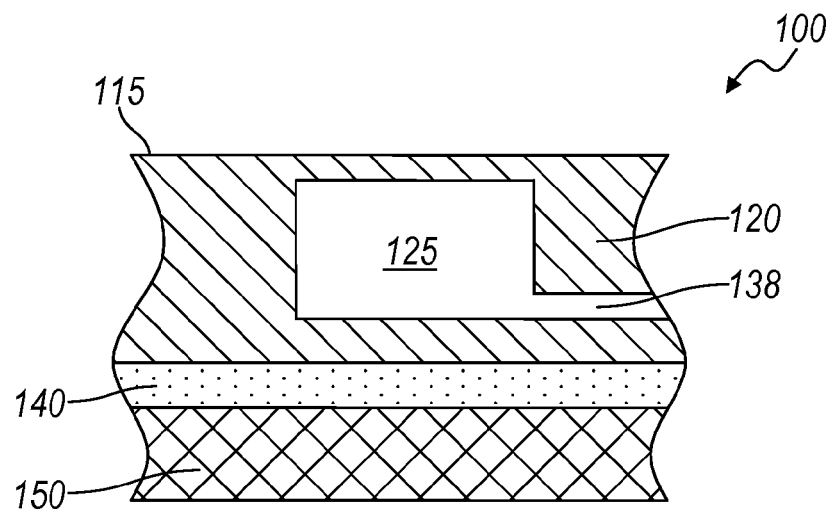
FIGS. 5a and 5b are cross-sectional views of the layer and the substrate combined as a singular structure, with the cavity in a retracted volume setting and an expanded volume setting, respectively.
Figure 5B:
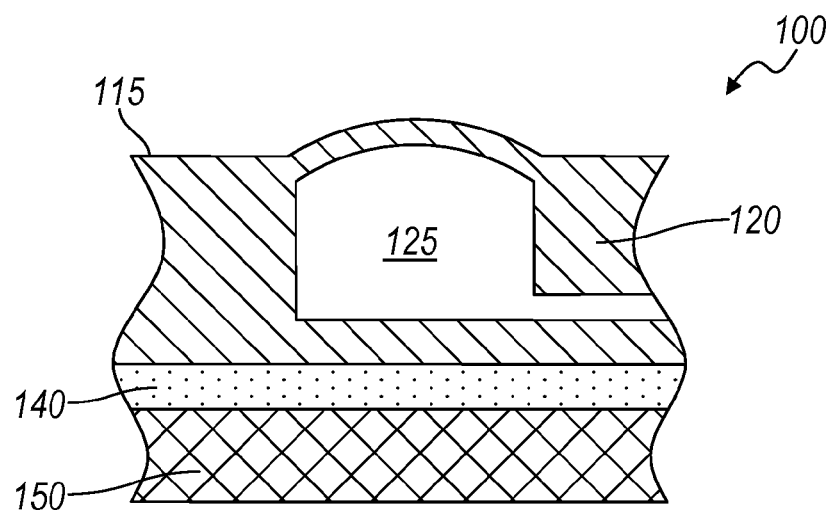
Figure 6A:
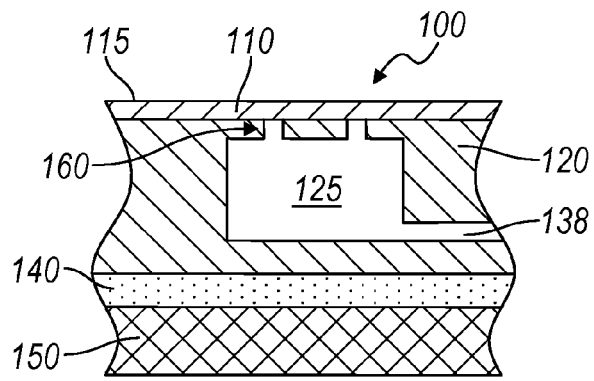
FIGS. 6a and 6b are cross-sectional views of a support member between the layer and the substrate, with the cavity in a retracted volume setting and an expanded volume setting, respectively.
Figure 6C:
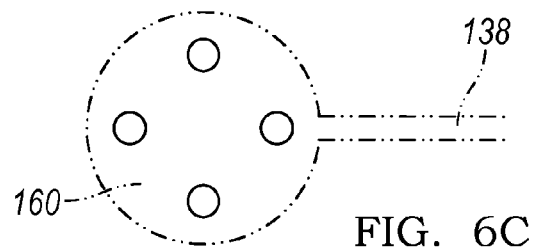
FIG. 6c is a top view of the support member.
Figure 6B:
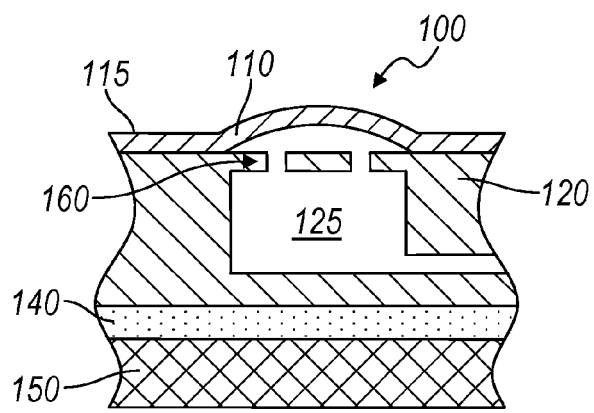
Figure 6D:
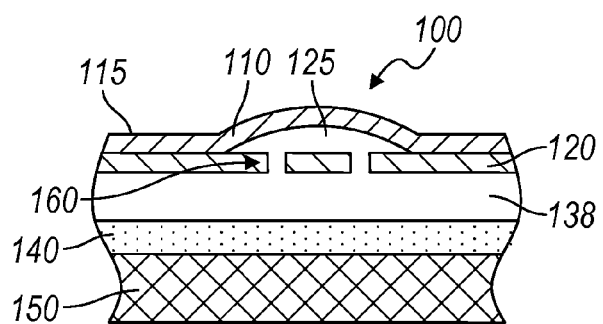
FIG. 6d is a cross-sectional view of an alternative support member that partially defines the cavity.
Figure 22A:
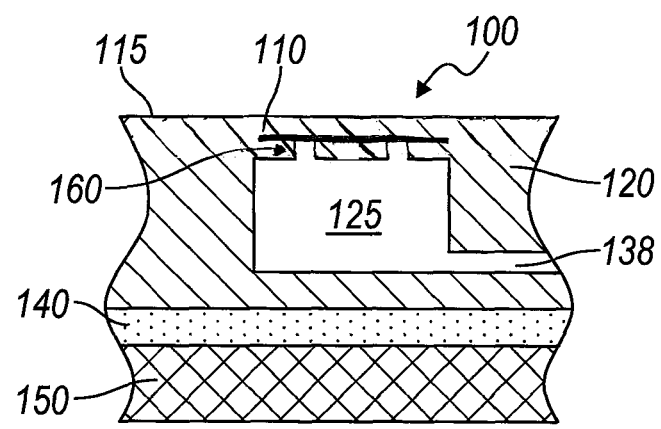
FIGS. 22A and 22B are schematic representations of one variation of the user interface system.
Figure 22B:
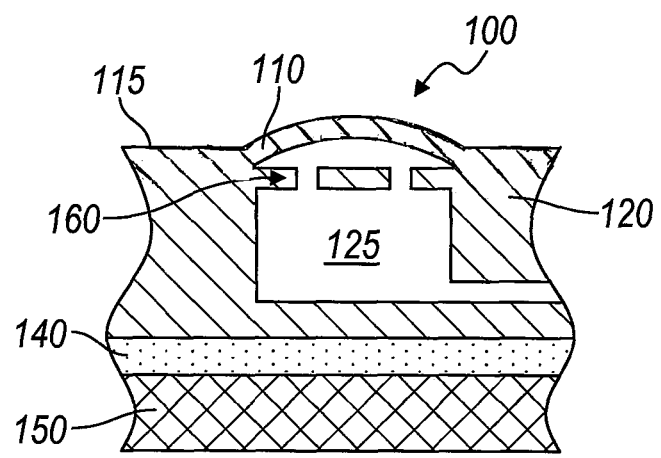
Figure 23:
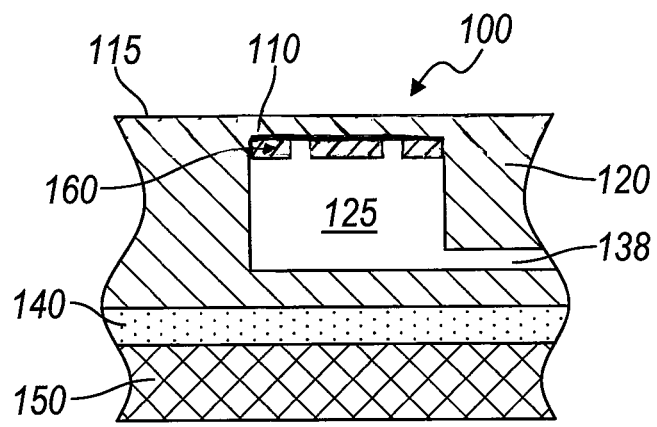
FIGS. 23A and 23B are schematic representations of one variation of the user interface system.
Figure 23:
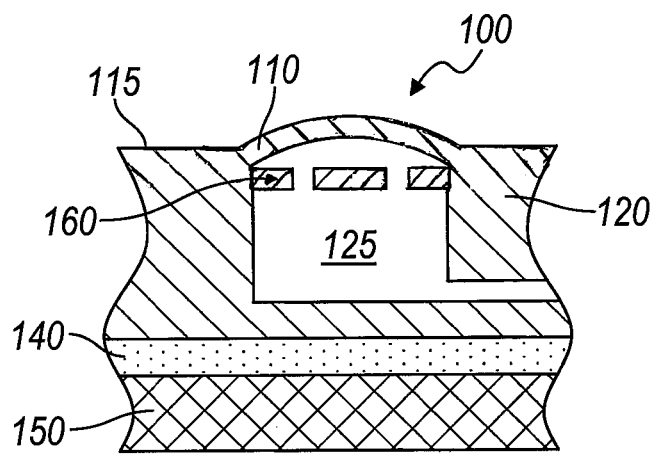

The substrate 120 of the preferred embodiments functions to support the layer 110 and to at least partially define the cavity 125. In one version, as shown in FIGS. 3a and 3b, the layer 110 is directly attached to the substrate 120 using an adhesive, ultra-sonic bonding, oxygen plasma surface treatment, or any other suitable techniques known to one skilled in the art. The substrate 120 and the layer 110, in this version, cooperately define the cavity 125 (with the substrate 120 defining a "container" and the layer 110 defining a "membrane" over the "container"). In another version, as shown in FIGS. 4a and 4b, the layer 110 is indirectly attached to the substrate 120 with another element, such as the touch sensor 140 and/or the display 150 located between the layer 110 and the substrate 120. The substrate 120 and the intervening element define the cavity 125 in this version. In yet another version, as shown in FIGS. 5a and 5b, the layer 110 and the substrate 120 are formed as a singular structure, which fully defines the cavity 125. In yet one more version, as shown in FIGS. 6a and 6b, the substrate 120 may include a lattice-like support member 160 under the particular region of the surface 115. When the cavity 125 is expanded and the deformation is present in the surface 115, the support member 160 functions to prevent a user from "pressing too far" into the deformation below the plane of the surface 115. When the cavity 125 is not expanded and the deformation is not present in the surface 115, the support member 160 functions to reduce (or potentially eliminate) the user from feeling "divots" in the surface 115 when swiping a finger across the surface 115. As shown in FIG. 6c, the support member 160 preferably includes holes or channels that allow for the expansion of the cavity 125 and the deformation of the surface 115. The support member 160 is preferably integrally formed with the substrate 120, but may alternatively be formed with the layer 110, as shown in FIGS. 22A and 22B, or may be separately formed and later attached to the substrate 120 as shown in FIGS. 23A and 23B. Finally, as shown in FIG. 6d, the support member 160 may alternatively define the cavity 125. The substrate 120 is preferably rigid, but may alternatively be flexible in one or more directions. The substrate 120—if located above the display 150 is preferably optically transparent, but may—if located below the display 150 or if bundled without a display 150— be translucent or opaque. The substrate 120 is preferably made from a material including polymers or glass, for example, elastomers, silicon-based organic polymers such as poly-dimethylsiloxane (PDMS), thermoset plastics such as polymethyl methacrylate (PMMA), and photocurable solvent resistant elastomers such as perfluropolyethers. The substrate 120 may, however, be made of any suitable material that supports the layer 110 and at least defines the cavity 125. In the preferred version, the substrate 120 is a single homogenous layer approximately 1mm to 0.1 mm thick and can be manufactured using well-known techniques for micro-fluid arrays to create one or more cavities and/or micro channels. In alternative versions, the substrate 120 may be constructed using multiple layers from the same material or from different suitable materials.

As shown in FIGS. 3a and 3b, the cavity 125 of the preferred embodiment functions to hold a fluid and to have at least two volumetric settings: a retracted volume setting (shown in FIG. 3a) and an extended volume setting (shown in FIG. 3b). The fluid is preferably a liquid (such as water, glycerin, or ethylene glycol), but may alternatively be a gas (such as air, nitrogen, or argon) or any other substance (such as a gel or aerogel) that expands the cavity 125 and deforms the surface 115. In the extended volume setting, the cavity 125 extends above the plane of the surface 115, thereby deforming a particular region of the surface 115. As explained above, the cavity 125 is preferably defined by the substrate 120 and the layer 110 (or an intervening element), or by the substrate 120 and layer 110 as a singular structure, as shown in FIGS. 22A and 22B. In one version, as shown in FIGS. 6a and 6b and as further explained below, the cavity 125 does not have any fluidic connection to any other elements of the user interface system 100. The displacement device 130, in this version, may be located within or adjacent to the cavity 125. In another version, the cavity 125 includes a fluidic connection via a channel to a (remotely located)

displacement device 130. In both cases, the cavity 125 can be considered an "enclosed cavity" since the cavity 125 is preferably fluid tight (except for any fluidic connections to the displacement device 130). When used with a mobile phone device, the cavity 125 preferably has a diameter of 2-10mm. When used with this or other applications, however, the cavity 125 may have any suitable dimension.

2. The Displacement Device

The displacement device 130 of the preferred embodiment functions to modify the volume of the fluid thereby expanding the cavity 125 from the retracted volume setting to the extended volume setting and, ultimately, deforming a particular region of the surface 115. The displacement device 130 preferably modifies the volume of the fluid by (1) modifying the volume of the existing fluid in the cavity 125, or (2) adding and removing fluid to and from the cavity 125. The displacement device 130 may, however, modify the volume of the fluid by any suitable device or method. Modifying the volume of the existing fluid in the cavity 125 most likely has an advantage of lesser complexity, while adding and removing fluid to and from the cavity 125 most likely has an advantage of maintaining the deformation of the surface 115 without the need for additional energy (if valves or other lockable mechanisms are used). When used with a mobile phone device, the displacement device 130 preferably increases the volume of the fluid within the cavity 125 by approximately 0.003-0.1 mL When used with this or other applications, however, the volume of the fluid may be increased (or possibly decreased) by any suitable amount.

Figure 7A:
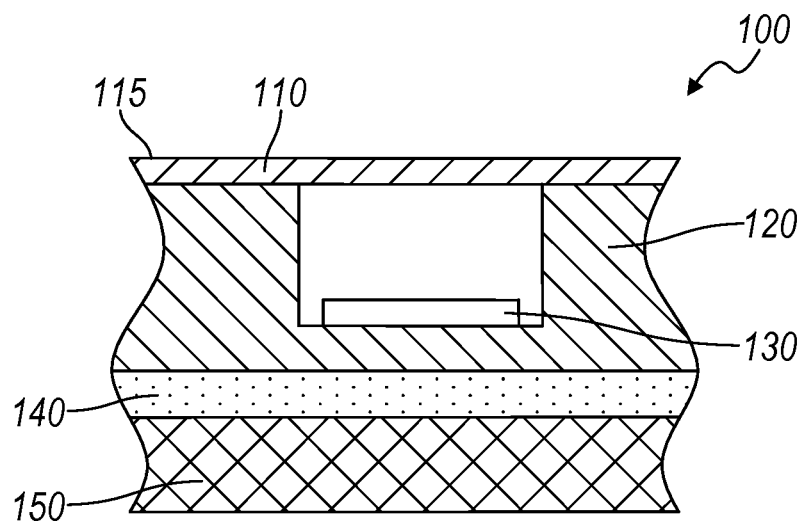
FIGS. 7a and 7b are cross-sectional views of the layer, the substrate, the cavity, the touch sensor, the display, and a displacement device that modifies the existing fluid in the cavity, with the cavity in a retracted volume setting and an expanded volume setting, respectively.
Figure 7B:
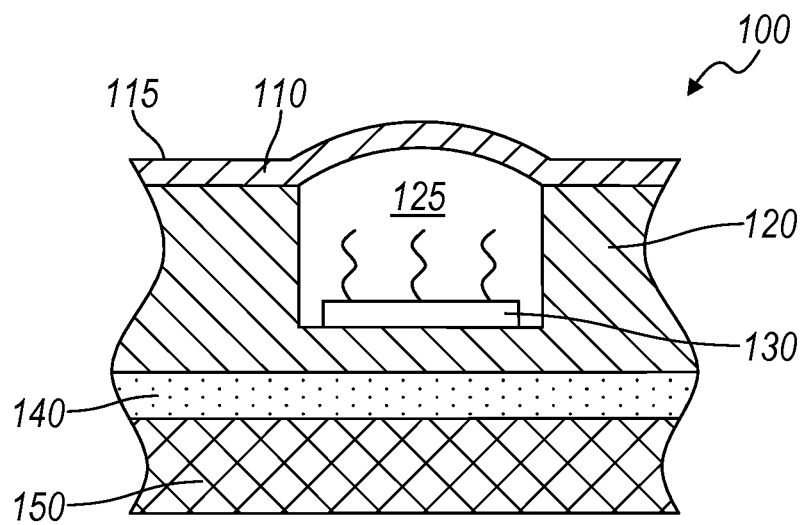

Modifying the existing fluid in the cavity 125 may be accomplished in several ways. In a first example, as shown in FIGS. 7a and 7b, the fluid may be an expandable fluid and the displacement device 130 may include a heating element that heats the expandable fluid, thereby expanding the volume of the existing fluid in the cavity 125 (according to the ideal gas law, PV=nRT). The heating element, which may be located within or adjacent the cavity 125, is preferably a resistive heater (made of a material such as TaN or Nichrome). In a second example, the fluid may include an expandable substance, such as plastic expandable microspheres. In a third example, the fluid may include paraffin. While these are three examples, the displacement device 130 can be any other suitable device or method that ultimately expands the cavity 125 from the retracted volume setting to the extended volume setting by modifying the existing fluid in the cavity 125.

Figure 8:
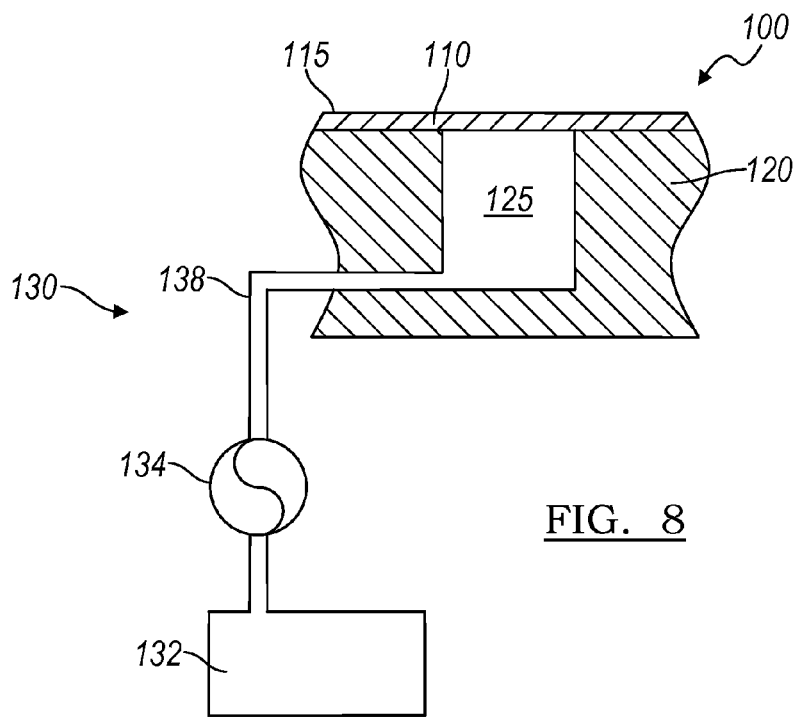
FIG. 8 is a schematic view of the layer, the substrate, the cavity, the touch sensor, the display, and a displacement device of a first example that displaces additional fluid into the cavity.
Figure 9:
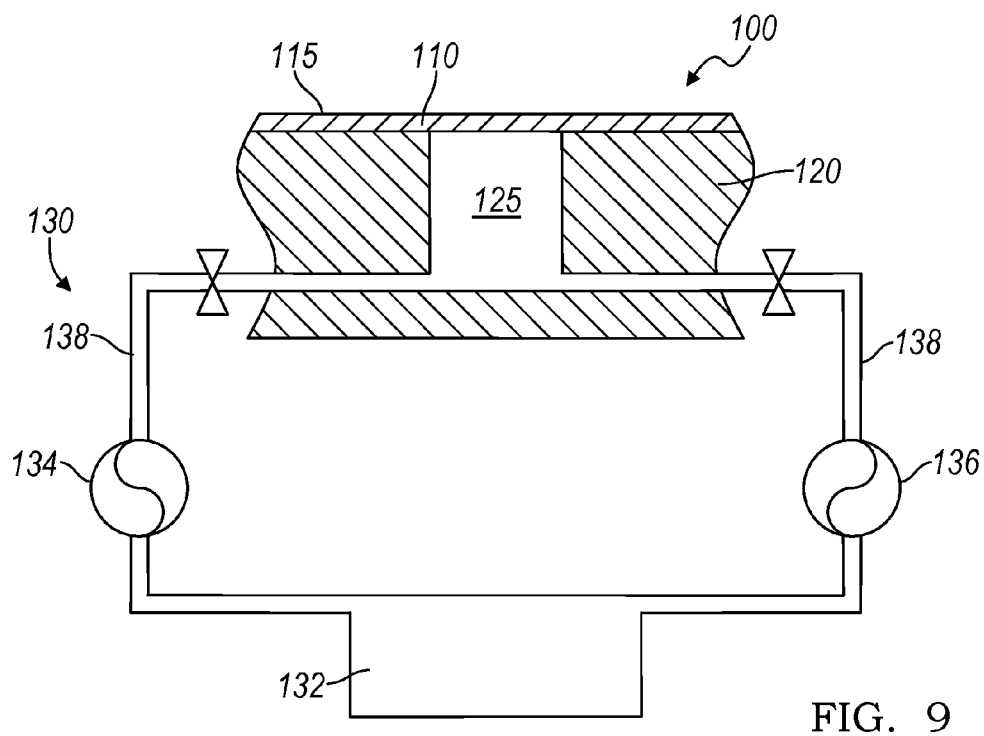
FIG. 9 is a schematic view of the layer, the substrate, the cavity, the touch sensor, the display, and a displacement device of a second example that displaces additional fluid into the cavity.
Figure 10A:
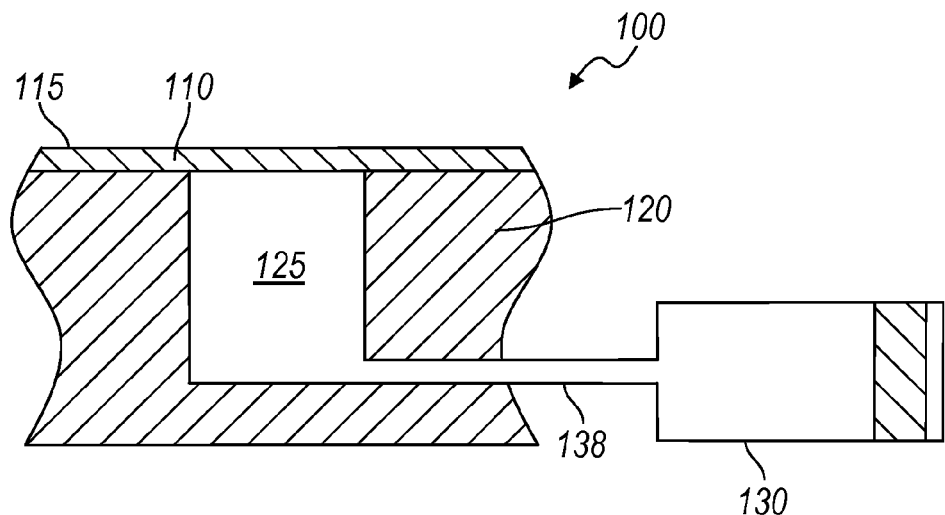
FIGS. 10a and 10b are schematic views of the layer, the substrate, the cavity, the touch sensor, the display, and a displacement device of a third example that displaces additional fluid into and out of the cavity, with the cavity in a retracted volume setting and an expanded volume setting, respectively.
Figure 10B:
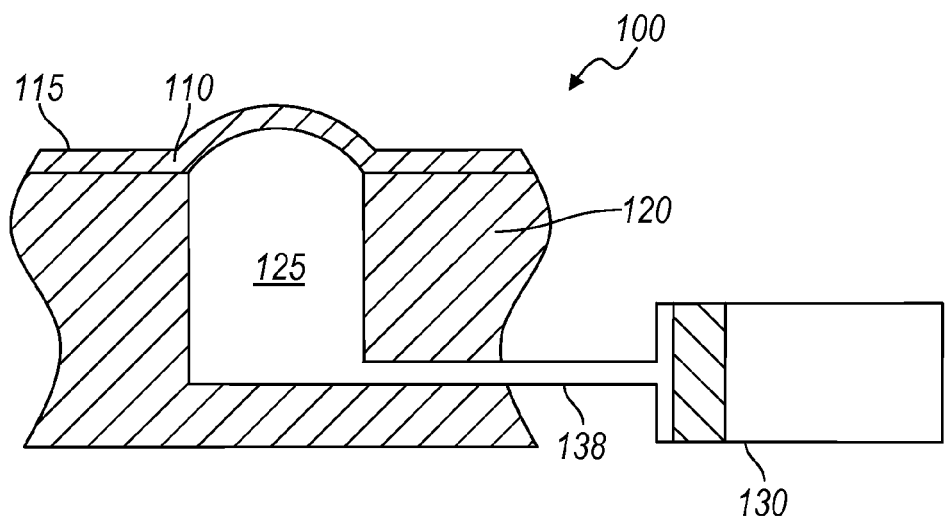

Adding and removing fluid to and from the cavity 125 may also be accomplished in several ways. In a first example, as shown in FIG. 8, the displacement device 130 includes a reservoir 132 to hold additional fluid and a pump 134 to displace fluid from the reservoir 132 to the cavity 125. The reservoir 132 is preferably remote from the cavity 125 (and connected by a channel 138 or other suitable device), but may alternatively be located adjacent the cavity 125 and connected directly to the cavity 125. A portion of the channel 138 is preferably a micro-fluidic channel (having cross-section dimensions in the range of 1 micrometer to 1000 micrometers), but depending on the size and costs constraints of the user interface system 100, the channel 138 may have any suitable dimensions. The pump 134 is preferably a micropump (such as pump #MDP2205 from ThinXXs Microtechnology AG of Zweibrucken, Germany or pump #mp5 from Bartels Mikrotechnik GmbH of Dortmund, Germany), but may be any suitable device to pump fluid from one location to another. The pump 134 is preferably located at a distance from the cavity 125, and is preferably connected to the cavity 125 by a channel 138. To extend the cavity 125 from a retracted volume setting to the extended volume setting, the pump 134 displaces fluid from a reservoir 132, through the channel 138, and into the cavity 125. To retract the cavity 125 from the extended volume setting to the retracted volume setting, the pump 134 preferably "vents" or pumps in a reverse direction from the cavity 125 to the reservoir 132. In a second example, as shown in FIG. 9, the displacement device 130 includes a reservoir 132 to hold additional fluid, a first pump 134 to displace fluid from the reservoir 132 to the cavity 125, a second pump 136 to displace fluid from the cavity 125 to the reservoir 132, a first valve located between the first pump 134 and the cavity 125, and a second valve located between the cavity 125 and the second pump 136. To extend the cavity 125 from the retracted volume setting to the extended volume setting, the first valve is opened, the second valve is closed, and the first pump 134 displaces fluid from the reservoir 132, through the channel 138, and into the cavity 125. To retract the cavity 125 from the extended position to the retracted position, the first valve is closed, the second valve is opened, and the second pump 136 displaces fluid from the cavity 125, through the channel 138, and into the reservoir 132. In other respects, the second example is similar to the first example above. The user interface system 100 may omit the second pump 136 and simply retract the cavity 125 from the extended volume setting to the retracted volume setting by opening the second valve and allowing the cavity 125 to vent or "drain" into the reservoir 132 (potentially assisted by the elasticity of the layer 110 returning to an un-deformed state). In a third example, as shown in FIGS. 10a and 10b, the displacement device 130 includes an actuator, such as a linear actuator, that displaces fluid into and out of the cavity 125. To extend the cavity 125 from a retracted volume setting to the extended volume setting, as shown in FIG. 10a, the linear actuator displaces fluid through the channel 138 and into the cavity 125. To retract the cavity 125 from the extended volume setting to the retracted volume setting, as shown in FIG. 10b, the linear actuator draws fluid in a reverse direction from the cavity 125 to the reservoir 132. In other respects, the third example is similar to the second example above. While these are three examples, the displacement device 130 can be any other suitable device or method that ultimately expands the cavity 125 from the retracted volume setting to the extended volume setting by adding and removing fluid to and from the cavity 125.

Although the cause of the deformation of a particular region of the surface 115 has been described as a modification of the volume of the fluid in the cavity 125, it is possible to describe the cause of the deformation as an increase in the pressure below the surface 115 relative to the pressure above the surface 115. When used with a mobile phone device, an increase of approximately 0.1-10.0 psi between the pressure below the layer no relative to the pressure above the layer no, is preferably enough to deform a particular region of the surface 115. When used with this or other applications, however, the modification of the pressure may be increased (or possibly decreased) by any suitable amount.

The deformation of the surface 115 functions to provide a tactile feedback that signals the location of the particular region of the surface 115. When used in conjunction with an input graphic on the display 150, the deformation of the surface 115 preferably signals the location of an input on the touch sensor 140. The deformation preferably acts as (1) a button that can be pressed by the user and that signals the location of a single input on the touch sensor 140 under the button, (2) a slider that can be pressed by the user and that signals the location of multiple inputs on the touch sensor 140 under the slider, (3) a guide that signals the location of multiple inputs on the touch sensor 140 adjacent the guide, and (4) a pointing stick that signals the location of multiple inputs on the touch sensor 140 under and adjacent the pointing stick. The deformation may, however, act as any other suitable device or method that signals the location of a particular region of the surface 115. The button, as shown in FIG. 11, preferably has a dome-like shape, but may alternatively have a cylindrical-like shape (with a flat top surface), a pyramid-like shape, a cube-like shape (with a flat top), or any other suitable button shape. The touch sensor 140 preferably recognizes any user touch 145 into the button as a user input. The slider, as shown in FIGS. 12 and 13, preferably has a ridge like shape (shown in FIG. 12), but may alternatively have a ring like shape (shown in FIG. 13), a plus-like shape, or any other suitable slider shape. The touch sensor 140 preferably recognizes user touches 145 at different locations into the slider and distinguishes these user touches as different user inputs. As an example, the slider with the ring like shape may act like the "click wheel" of the Apple iPod (second generation). The guide, as shown in FIG. 14, preferably has a double ridge shape or a double ring shape. Unlike the button and the slider, which are meant to be pressed by the user, the guide is meant to signal the location next to the area meant to be pressed by the user. The touch sensor 140 preferably recognizes user touches 145 at different locations between the two ridges and distinguishes these user touches as different user inputs. In another version, the guide may omit the second ridge. The pointing stick, like the button, preferably has a dome-like shape, as shown in FIG. 15, but may alternatively have a cylindrical-like shape (with a flat top surface), a pyramid-like shape, a cube-like shape (with a flat top), or any other suitable button shape. The pointing stick is meant to signal the location under and adjacent the area meant to be pressed by the user. The touch sensor 140 preferably recognizes user touches 145 at different locations under and around the pointing stick and distinguishes these user touches as different user inputs. As an example, the point stick may act like the pointing stick trademarked by IBM as the TRACKPOINT and by Synaptics as the TOUCHSTYK (which are both informally known as the "nipple").

3. The Touch Sensor and the Display

The touch sensor 140 of the preferred embodiments functions to sense a user touch proximate the particular region of the surface 115. The touch sensor 140 is preferably located under the substrate 120 (as shown in FIGS. 3a and 3b), but may alternatively be located above the substrate 120 (as shown in FIGS. 4a and 4b). If located above the substrate 120, in addition to sensing a user touch, the touch sensor 140 also functions to deform upon an expansion of the cavity 125 and therefore the touch sensor 140 preferably has elastic properties similar to the layer 110. As a variation of this version, the touch sensor 140 may act as the layer 110 to partially define the cavity 125. The touch sensor 140 preferably senses a user touch in a continuous or multiple step manner. For example, the touch sensor 140 preferably distinguishes a resting user touch (that does not significantly modify the deformation of the surface 115), a gentle user touch (that partially pushes the surface 115 back to the normal, unexpanded plane of the surface 115), and a hard user touch (that completely pushes the surface 115 back to the normal, unexpanded plane of the surface 115). In other words, the touch sensor 140 preferably senses different "heights" of the deformation. The touch sensor 140 may, however, simply sense a user touch in a binary manner ("on" or "off"). In one example, the touch sensor 140 is preferably a conventional capacitance-based touch sensor, such as the touch panel sold by Synaptics under the trademark CLEARPAD, but may be any suitable device that senses a user touch. The capacitance-based touch sensor preferably senses a user touch based on the change in capacitance between two locations within or near the cavity 125. In another example, the touch sensor 140 is a pressure sensor either located in or coupled to the cavity 125. The pressure sensor preferably senses a user touch based on a change in the pressure within the cavity 125 caused by a user touch on the deformation of the surface 115. In yet another example, the touch sensor 140 is integrated with the displacement device 130 to sense either a fluid displacement or a pressure change caused by a user touch on the deformation of the surface 115. While these are three examples, the touch sensor 140 can be any other suitable device or method that senses a user touch proximate the deformation of the surface 115.

The display 150 of the preferred embodiments functions to interface with a user in a visual manner. The display 150 is preferably a conventional liquid crystal display (LCD), but may alternatively any suitable device that displays an output. In one version, as shown in FIGS. 3a and 3b, the display 150 is located under the substrate 120. In another version, the touch sensor 140 and the display 150 may be integrated as a single structure that both senses a user input and displays an output. For example, an LCD with embedded optical sensors both touch screen and scanner functions was announced in a 2007 press release by Sharp Electronics of Japan. This combined touch sensor/display—if flexible—may be located above the substrate 120, and—if not flexible—may be located below the substrate 120. If the display 150 is located below the substrate 120 and the fluid, then the substrate 120 and the fluid are preferably transparent and are preferably chosen to have substantially similar (if not identical) refractive indexes. An example of a substrate 120 and fluid that have substantially similar refractive indexes include: PMMA (which has an index of refraction of 1.489) and the Cargille Laboratories Series A fluids (which cover the range of 1.460-1.640) or a mixture of Diethyl Phthalate and water. When used in mobile phones, "substantially similar" in this context preferably means +/−0.1 relative to each other. When used in this and other applications, "substantially similar" may alternatively mean similar enough to prevent viewing distortions of the display 150. The display 150 preferably outputs several different visual outputs. One of the outputs is preferably an input graphic that is aligned with the particular region of the surface 115 that can be deformed by the cavity 125 in the extended volume setting. Examples of suitable input graphics include individual letters of a QWERTY keyboard, individual numbers in a dial pad, and different locations on a map.

4. The Processor

Figure 16:
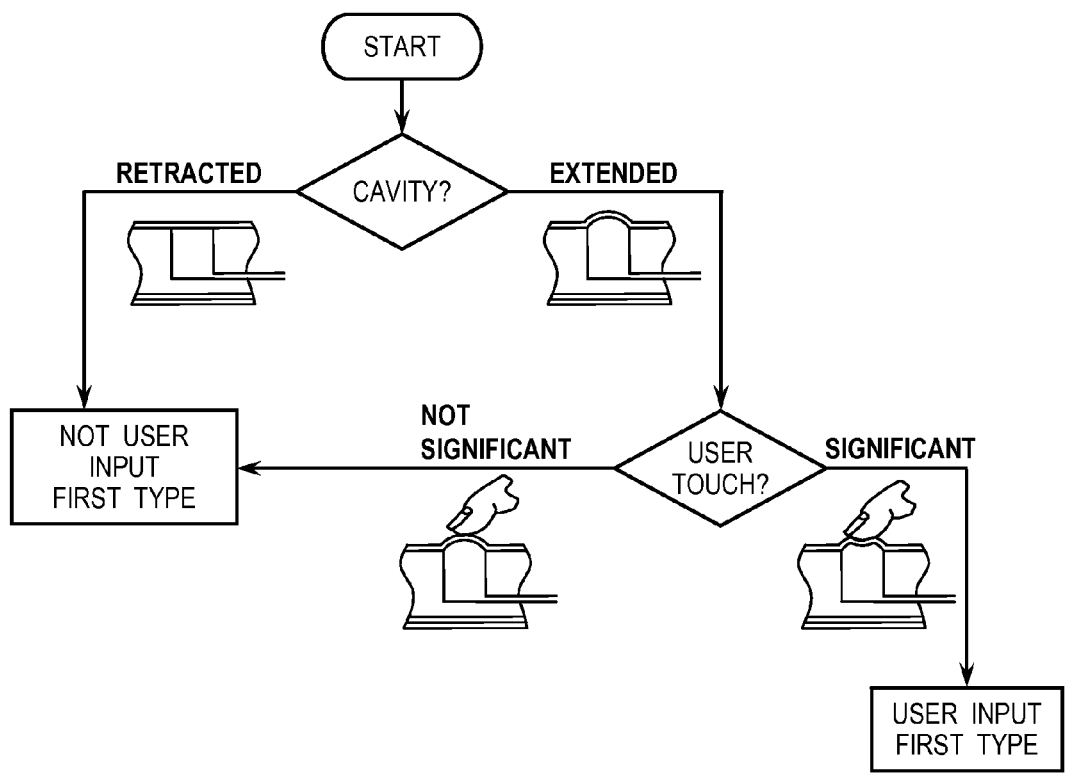
FIG. 16 is a flow chart of the different operation modes of the preferred embodiments.

The user interface system 100 of the preferred embodiment also includes a processor, which is coupled to the displacement device 130 and to the touch sensor 140. As shown in FIG. 16, the processor functions to operate the user interface system 100 in an Extended Cavity Mode and a Retracted Cavity Mode. In the Extended Cavity Mode, if the particular region of the surface 115 is deformed, then a user touch that further significantly deforms the particular region of the surface 115 is preferably recognized as a user input of a first type. A user touch that does not significantly deform the particular region of the surface 115, such as the touch of a user resting their fingers on the deformation, is preferably not recognized as a user input of the first type (and is preferably ignored). In this manner, the deformation of the surface 115 additionally functions to distance the user touch from the touch sensor 140 and to allow the user to rest their fingers on the deformation (the location of an input) without actuating the input. The question of whether a user has significantly or not significantly deformed the particular region of the surface 115 may be set or modified by the manufacturer, by the processor, or by the user. In the Retracted Cavity Mode, if the particular region of the surface 115 is not deformed, then a user touch at the particular region in the surface 115 is preferably not recognized as a user input of the first type, but rather is recognized as a user input of a second type that is distinguishable from a user input of the first type.

The processor may also function to automatically alter the settings of the user interface system 100. In a first example, in extremely low temperatures, it may be impossible for the displacement device 130 to modify the volume of the fluid to expand the cavity 125 and deform the surface 115. The processor may be coupled to a temperature sensor and may disable the displacement device 130 under such conditions. In a second example, in high altitude conditions (or in an airplane with reduced air pressure), it may be impossible for the displacement device 130 to modify the volume of the fluid to retract the cavity 125. The processor may be coupled to a pressure sensor and may either disable the displacement device 130 (or close particular valves), or may simply adjust the volume of the fluid that is modified under such conditions.

As shown in FIG. 17, the processor may also be coupled to the display 150 such that different input graphics may be displayed under the same deformation of the surface 115, and different inputs may be recognized. As an example, when the cavity 125 is in the extended volume setting, the display 150 may include an input graphic of a first type (such as a letter) and the user input on the deformation would be of a first type (such as a letter), and the display 150 may include an input graphic of a second type (such as a number) and the user input on the deformation would be of a second type (such as a number). When the cavity 125 is in the retracted volume setting, the display 150 may further include an input graphic of a third type (such as an "enter" or "accept" input), and the user input on the touch sensor 140 would be of a third type (such as an "enter" or "accept" input).

The processor may also function to alter the output of the display 150 to correct or adjust for any optical distortion caused by the deformation in the surface 115. It is envisioned that, in certain applications, the size of the deformation may cause a "fish eye" effect when viewing the display 150. The processor, preferably through empirical data, may adjust the output to help correct for this distortion.

The processor preferably includes a separate and remote controller for the displacement device 130, a separate and remote controller for the touch sensor 140, and a separate and remote controller for the display 150. The processor may, however, integrally include a controller for one or more of these elements.

5. Second Cavity

Figure 18A:
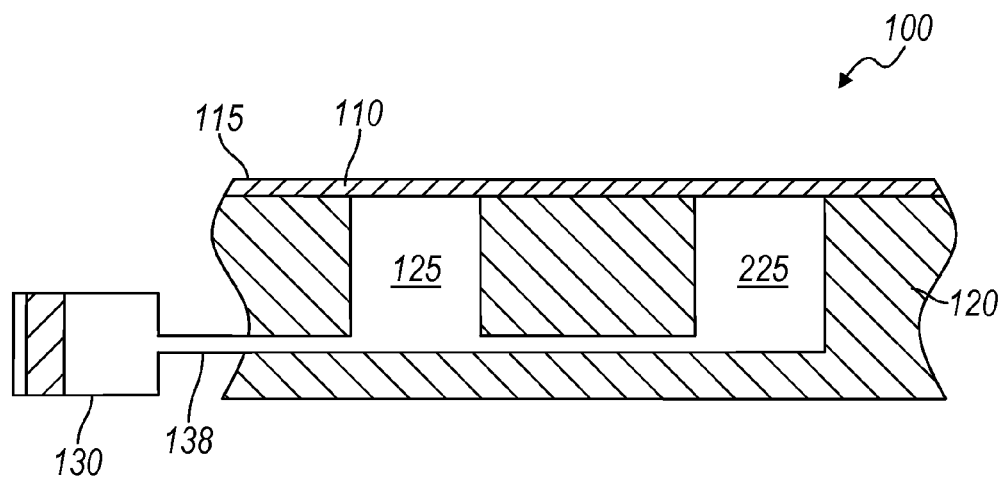
FIGS. 18a and 18b are schematic views of the cavity and the second cavity connected to a single displacement device, with the cavity in a retracted volume setting and an expanded volume setting, respectively.
Figure 18B:
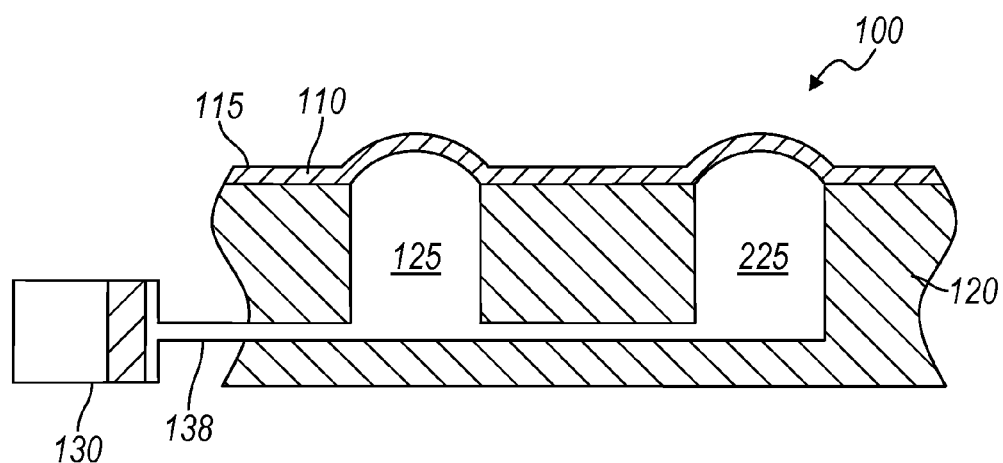
Figure 19A:
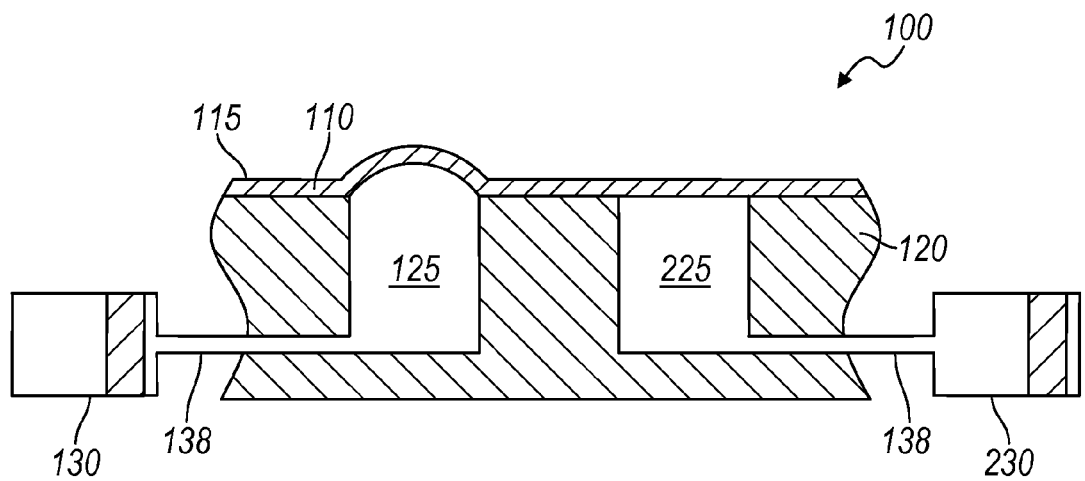
FIGS. 19a and 19b are schematic views of the cavity and the second cavity connected to a separate displacement devices, with the cavity in a retracted volume setting and an expanded volume setting, respectively.
Figure 19B:
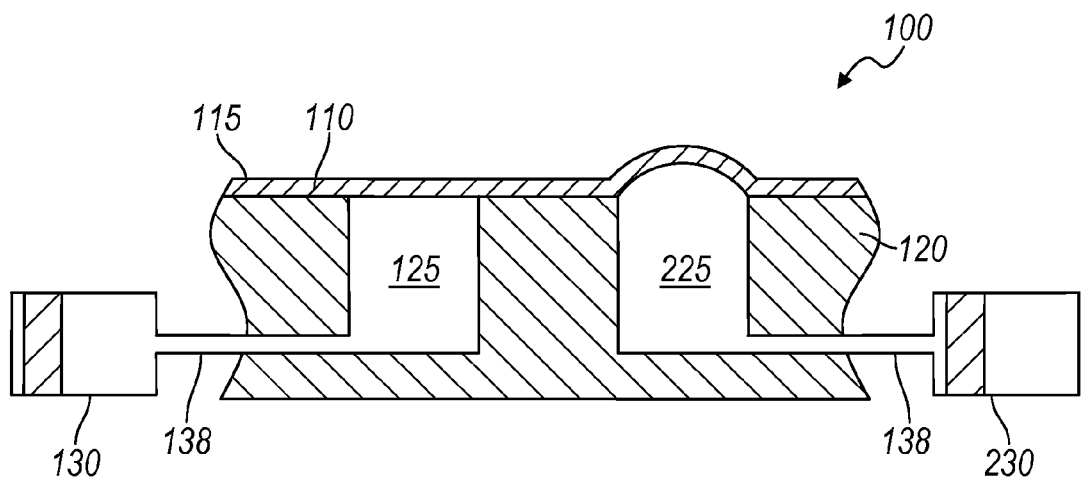
Figure 20A:
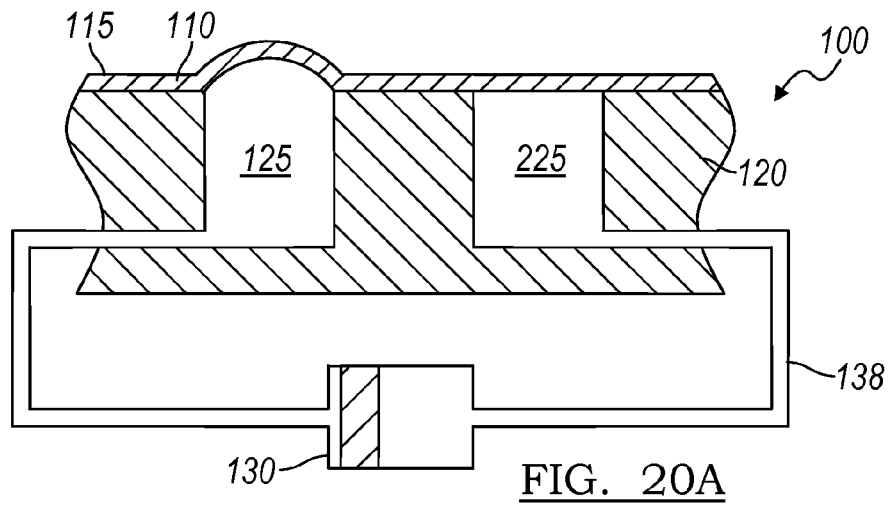
FIGS. 20a, 20b, and 20c are schematic views of the cavity and the second cavity connected to a linear actuator, with the cavity in the expanded volume setting and the second cavity in the retracted volume setting, the cavity and the second cavity in the retracted volume setting, and the cavity in the retracted volume setting and the second cavity in the expanded volume setting, respectively.
Figure 20B:
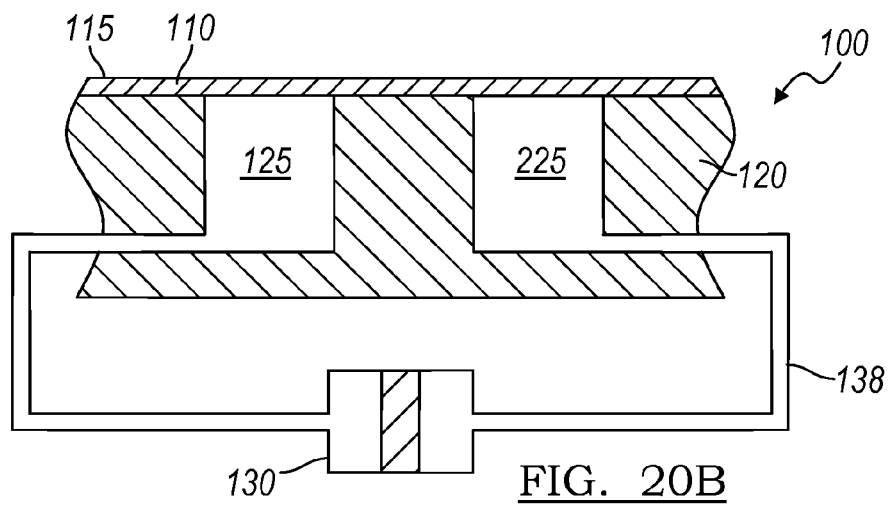
Figure 20C:
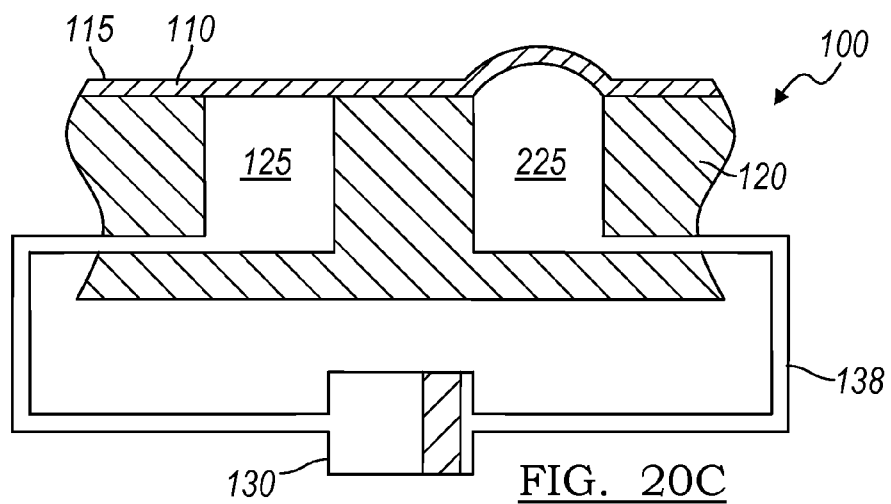
Figure 21A:
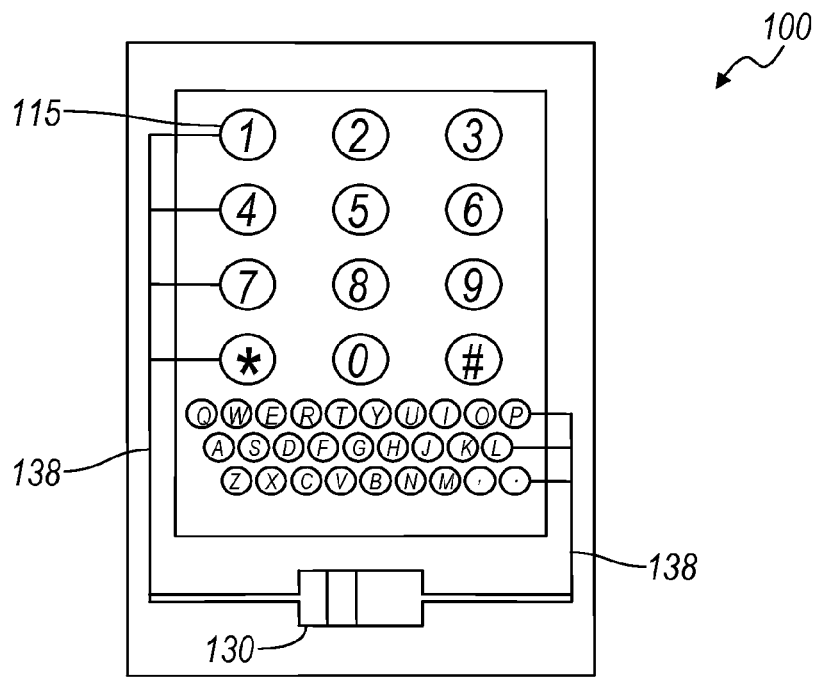
FIG. 21a is a schematic view of a first cavity array arranged in a dial pad and a second cavity array arranged in a QWERTY keyboard on the same device.
Figures 21B, 21C:
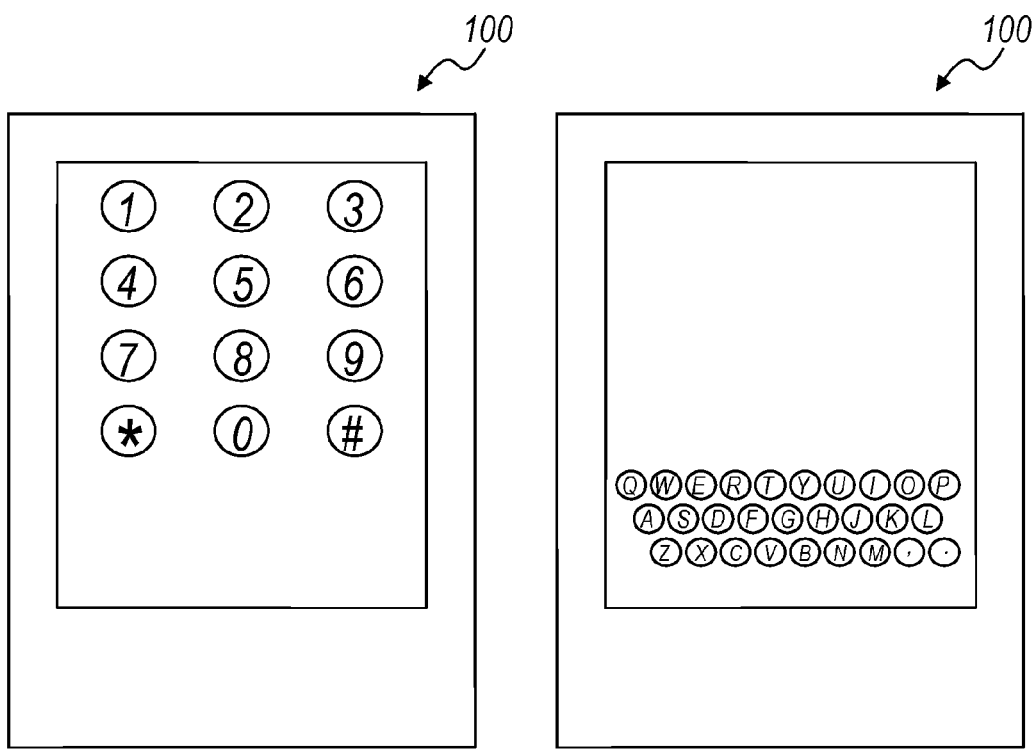
FIGS. 21b and 21c are schematic views of the display of a dial pad aligned with the first cavity array and a QWERTY keyboard aligned with the second cavity array, respectively.

As shown in FIGS. 1 and 2, the user interface system 100 of the preferred embodiment also includes a second cavity 225. The additional cavities, except as detailed below, are preferably identical to the cavity 125. In one version, as shown in FIGS. 18a and 18b, the displacement device 130 is connected to both the cavity 125 and the second cavity 225 and is adapted to expand the cavity 125 and the second cavity 225 together, acting together as an array, thereby deforming more than one region of the surface 115 at the same time. In a second version, the user interface system 100 includes a valve located between the displacement device 130 and the cavity 125 and another valve located between the displacement device 130 and the second cavity 225 to selectively control the fluid flow into the cavity 125 and into the second cavity 225, respectively. In a third version, as shown in FIGS. 19a and 19b, the user interface system 100 includes a second displacement device 230 connected to the second cavity 225, which functions to expand the second cavity 225 and thereby deforming a second region of the surface 115. The second displacement device 230 is otherwise similar or identical to the displacement device 130. By separately controlling the displacement device 130 and the second displacement device 23o, the cavity 125 and the second cavity 225 may be expanded independently. In a fourth version, as shown in FIGS. 20a, 20b, and 20c, the displacement device 130 is a linear actuator that can either expand the cavity 125 and retract the second cavity 225 (shown in FIG. 20a), retract the cavity 125 and the second cavity 225 (shown in FIG. 20b), or retract the cavity 125 and expand the second cavity 225 (shown in FIG. 20c). This arrangement may be particularly useful in large arrays of cavities, as shown in FIG. 21a, where the cavities aligned with a dial pad can be expanded (as shown in FIG. 21b) or the cavities aligned with a QWERTY keyboard can be expanded (as shown in FIG. 21c).

6. Power Source

The user interface system 100 of the preferred embodiments also includes either a power source or a power harnessing device, which both function to power the displacement device 130 (and possibly other elements of the user interface system, such as the touch sensor 140 and/or the display 150). The power source is preferably a conventional battery, but may be any suitable device or method that provides power to the displacement device 130. The power-harnessing device, which is preferably integrated into the hinge of a flip phone or laptop, functions to harness a portion of the energy involved in the normal use of the electronic device (such as the opening of a flip phone or the screen on a laptop). The power-harnessing device may alternatively be integrated in a separate mechanical input device (such as a button on the side of a mobile phone, or a "self-winding" device found in automatic watches) or any other suitable device or method to harness a portion of the energy involved in the normal use of the electronic device.

7. Alternative Embodiments

The user interface system of an alternative embodiment of the invention omits the display 150. The user interface system of the alternative embodiment is otherwise similar or identical to the user interface system 100 of the preferred embodiment. The user interface system of the alternative embodiment can be incorporated into electronic devices that do not typically include a display, such as peripheral for an electronic device. Suitable peripherals include a mouse, a trackpad, a keyboard, and a remote control. These peripherals are often used only by touch, and not by sight. The user interface system may, however, be incorporated in any suitable device.

As a person skilled in the art of user interfaces will recognize from the previous detailed description and from the figures and claims, modifications and changes can be made to the preferred embodiments of the invention without departing from the scope of this invention defined in the following claims.

We claim:
1. A user interface comprising:
a layer comprising a singular structure defining a cavity, a fluid channel, and a tactile surface, the tactile surface defining a deformable region adjacent the cavity and a peripheral region adjacent the deformable region, the tactile surface continuous over the deformable region and the peripheral region, the fluid channel configured to communicate fluid in a direction substantially parallel to the tactile surface at the peripheral region;
a support member extending into the cavity and configured to support the deformable region against inward deformation, the support member defining a lattice structure comprising a set of fluid conduits configured to fluidly couple the fluid channel to the cavity;

a displacement device configured to transition the deformable regional between a retracted setting and expanded setting by displacing fluid through the fluid channel and into the cavity via the set of fluid conduits, the tactile surface at the deformable region flush with the tactile surface at the peripheral region in the retracted setting, the tactile surface at the deformable region offset from the tactile surface at the peripheral region in the expanded setting; and a sensor coupled to the layer and configured to detect an input on the tactile surface.

2. The user interface of claim 1, wherein the support member is integrally formed with the layer.

3. The user interface of claim 1, further comprising a substrate coupled to the layer opposite the tactile surface and cooperating with the layer to define the fluid channel and the cavity.

4. The user interface of claim 3, wherein the layer is relatively elastic and wherein the substrate is relatively rigid.

5. The user interface of claim 1, wherein, in the expanded setting, the tactile surface at the deformable region is elevated above the tactile surface at the peripheral region.

6. The user interface of claim 5, wherein, in the expanded setting, the tactile surface at the deformable region defines one of: a button, a ridge, a ring, a slider, a pointing stick, and a guide.

7. The user interface of claim 1, wherein an interior face of the layer opposite the tactile surface is in contact with the support member in the retracted setting, the interior face of the layer partially defining the cavity.

8. The user interface of claim 7, wherein, in the expanded setting, the interior face is lifted off of the support member.

9. The user interface of claim 1, wherein each fluid conduit in the set of fluid conduits defines a substantially circular cross-section of a diameter approximating a thickness of the layer at the deformable region.

10. The user interface of claim 1, further comprising a reservoir coupled to the displacement device and configured to contain fluid.

11. The user interface of claim 1, wherein the sensor comprises a capacitive touch sensor.

12. The user interface of claim 1, wherein the sensor is coupled to the layer opposite the tactile surface.

13. The user interface of claim 1, further comprising a display coupled to the layer and configured to visually output an image through the tactile surface.

14. The user interface of claim 13, wherein the display is configured to output the image that comprises an input key substantially aligned with the deformable region.

15. The user interface of claim 1, wherein the displacement device comprises a pump.

16. The user interface of claim 1, wherein the displacement device is further configured to displace fluid out of the cavity to transition the deformable region from the expanded setting to the retracted setting.

17. The user interface of claim 1, further comprising a processor coupled to the sensor and configured to interpret an input on the tactile surface as one of an input of a first input type responsive to the deformable region in the retracted setting and an input of a second input type responsive to the deformable region in the expanded setting.

18. The user interface of claim 1, wherein the layer further defines a second cavity and a second fluid channel configured to communicate fluid into the second cavity, wherein the tactile surface further defines a second deformable region adjacent the second cavity, and wherein the displacement device is further configured to transition the second deformable region between a retracted setting and an expanded setting by displacing fluid through the second fluid channel and into the second cavity.

19. The user interface of claim 18, wherein the displacement device is configured to selectively transition the deformable region and the second deformable region between the retracted and expanded settings.

20. The user interface of claim 1 incorporated into a device selected from the group consisting of: an automotive console, a desktop computer, a laptop computer, a tablet computer, a television, a radio, a desk phone, a mobile phone, a PDA, a personal navigation device, a personal media player, a camera, and a watch.

21. The user interface of claim 1, wherein the layer defines the cavity that is circular in cross-section, and wherein the support member defines the lattice structure that comprises four fluid conduits arranged substantially equiangular about a radial center of the cavity.

* * * * *